United States Patent Office 3,269,375
Patented August 30, 1966

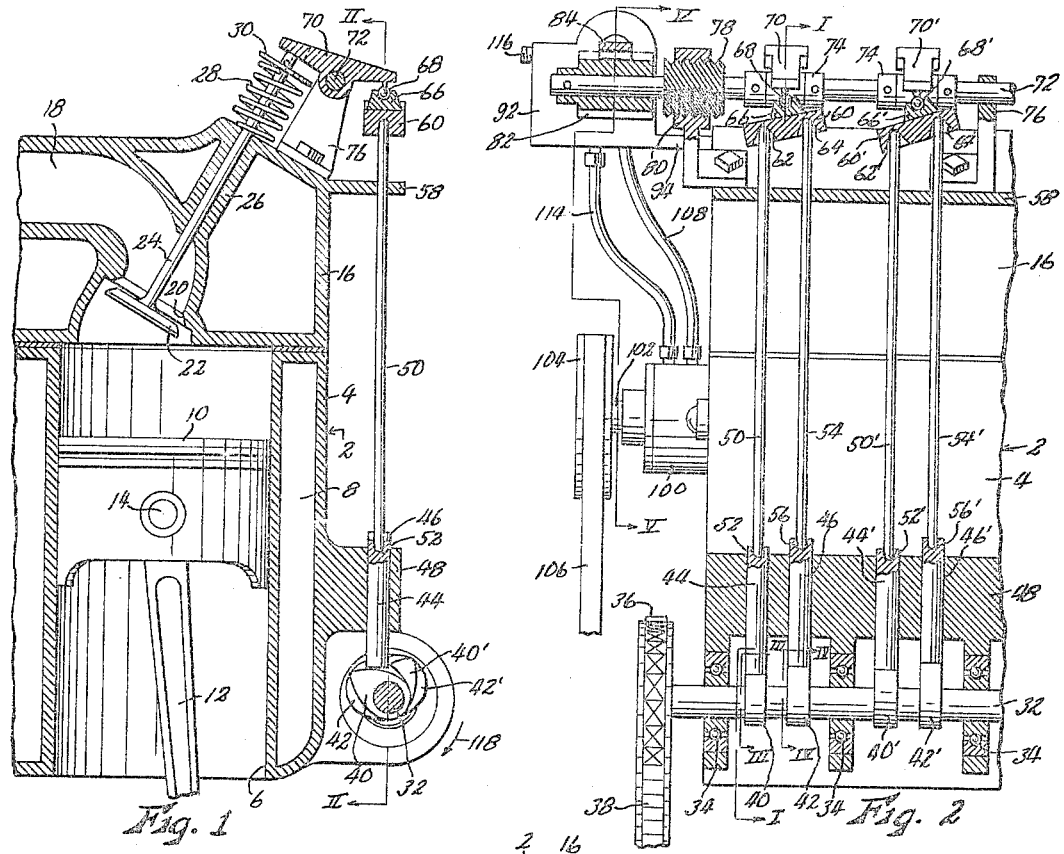
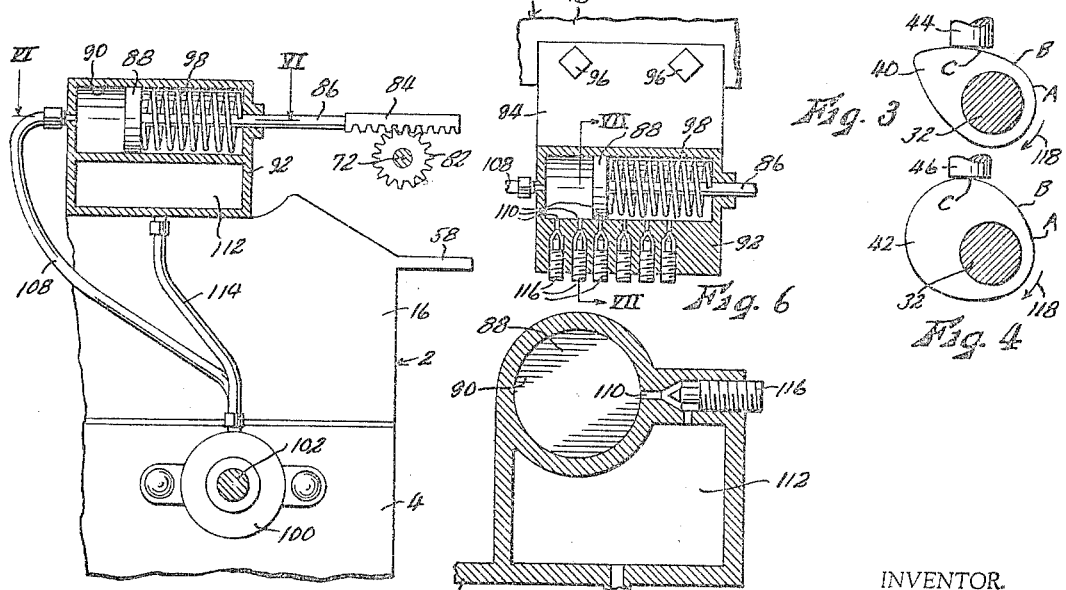

3,269,375
VARIABLE VALVE TIMING MECHANISM FOR INTERNAL COMBUSTION ENGINES
Robert G. Beal, 1240 Sumner St., Kansas City, Kans.
Filed Apr. 19, 1965, Ser. No. 449,150
7 Claims. (Cl. 123—90)

This invention relates to new and useful improvements in internal combustion engines, and has particular reference to the timing of the opening and closing of the valves which admit the explosive air-gasoline vapor mixture to the engine cylinders, and exhaust the combustion gases from the cylinders after burning thereof has occurred.

In most internal combustion engines within my knowledge, the opening and closing of the intake and exhaust valves of each cylinder is fixed, that it, each opening and closing of each valve occurs at the same position of the associated piston, regardless of the speed at which the engine may be running. Nevertheless, it is also well known that under some conditions, particularly those of high-speed operation as in racing cars, the most efficient operation requires that the valves open earlier in the engine cycle, and remain open later in the engine cycle, than is required at low engine speeds. This is true because the gases and vapors which must be introduced into and removed from the cylinder have an inertial resistance to movement, so that at high engine speeds, normal valve timing simply does not allow adequate time for a full charge of air-gas mixture to enter the cylinder, or for the exhaust gases to be fully removed. Conversely, once the gases have established a full momentum of movement through either of the valves, they tend by inertia to continue such movement even though the other valve is then opened. Therefore, it is not uncommon in a racing engine to have the intake and exhaust valves of each cylinder so timed that their open cycles "overlap," that is, the exhaust valve actually remains open for a short time after the intake valve has started its opening movement. This may result in a slight loss of air-gas mixture due to "blow-through" thereof from the intake to the outlet when both of the valves are open, but this loss is more than offset by the added efficiency provided by the fact that a full charge of air-gas mixture is insured by the overlap. However, while the advantages of increasing the "open" periods of the valves at higher engine speeds have been known, the mechanical difficulties and complications of incorporating a mechanism for taking advantage of this knowledge have prevented the adoption of such a system in ordinary automobile engines, wherein such advanced valve timing would be highly inefficient and unduly wasteful at lower speeds.

Accordingly, the principal object of the present invention is the provision, in an internal combustion engine, of means whereby the timing of the intake and exhaust valves, that is the points at which they open and close with respect to the cycle of movement of the associated pistons, may be adjusted in a rapid, easy and convenient manner.

Another object is the provision of a valve timing mechanism of the character described which adjusts the timing of the valves automatically in a pattern generally proportionate to the speed of operation of the engine.

A further object is the provision of a valve timing mechanism of the character described which adjusts the valve timing automatically in response to the speed of operation of the engine, in a pattern corresponding to but not necessarily proportionate to the engine speed, and having means for adjusting this pattern whereby a valve setting providing optimum operation in different speed ranges may be obtained.

Other objects are simplicity and economy of construction, efficiency and dependability of operation, and adaptability to be applied to pre-existing engines as an accessory "kit" which may be sold separately.

With these objects in view, as well as other objects which will appear in the course of the specification, reference will be had to the accompanying drawing, wherein:

FIG. 1 is a fragmentary transverse vertical sectional view through an internal combustion engine having a valve timing mechanism embodying the present invention incorporated therein, being essentially a sectional view taken on line I—I of FIG. 2, with parts left in elevation and partially broken away, FIG. 2 is a sectional view taken on line II—II of FIG. 1, with parts left in elevation and partially broken away.

FIG. 3 is an enlarged fragmentary sectional view taken on line III—III of FIG. 2, showing one of the two cams associated with each of the valves, FIG. 4 is an enlarged fragmentary sectional view taken on line IV—IV of FIG. 2, showing the other of the two cams associated with each of the valves, FIG. 5 is a fragmentary sectional view taken on line V—V of FIG. 2, FIG. 6 is a fragmentary sectional view taken on line VI—VI of FIG. 5, and FIG. 7 is an enlarged fragmentary sectional view taken on line VII—VII of FIG. 6.

Like reference numerals apply to similar parts throughout the several views, and the numeral 2 applies generally to an internal combustion engine including an engine block 4 in which are formed a series of hollow cylinders, only one of which is illustrated at 6, said cylinders being surrounded by a water jacket 8 for the circulation of cooling fluid, and opening through the top of the block. In each of the cylinders is slidably mounted a piston 10, said piston having a piston rod 12 pivoted thereto at 14, it being understood that the opposite end of the piston rod is pivoted to one of the crank pins of the usual crankshaft, not shown, in the usual manner, said crankshaft extending parallel to pivots 14. The upper ends of the cylinders are closed by a head 16 affixed to block 4, said head having an intake passage 18 for admitting an air-gas mixture into the upper end of cylinder 6 above piston 10. Said intake passage is equipped with a downwardly facing valve seat 20 controlled by an intake valve member 22 having a stem 24 projecting upwardly and slidably through a guide sleeve 26 of head 16, and terminating above said head. Said stem is biased upwardly, whereby to urge valve 22 against seat 20 to close the valve, by a valve spring 28 encircling the extended portion of the valve stem, said spring bearing at its lower end against head 16 and at its upper end against a retainer disc 30 affixed to the stem adjacent the extended extremity thereof. It will be understood that each cylinder 6 is also supplied with an exhaust passage in head 16 for conveying burned combustion gases out of the upper end of the cylinder at the proper time, and that said exhaust passage is controlled by an exhaust valve similar in all respects to intake valve 22, and mounted and biased upwardly to a closed position in the same manner. However, the exhaust valve is not specifically illustrated since it is merely a duplication of the intake valve as shown. Customarily, the stems of all of the valves of all of the cylinders are parallel, their upper ends being coextensive and disposed in a line parallel to the crankshaft when the valves are closed.

Automotive engines are most commonly of the four-cycle type. That is, the operative cycle of each piston includes four successive strokes thereof, and two full revolutions of the crankshaft. The first stroke is a downward intake stroke, during which an air-gas mixture is drawn or forced into the cylinder through passage 18, intake valve 22 then being open and the exhaust valve closed. The second stroke is an upward compression stroke during which the air-gas mixture is compressed in the upper portion of the cylinder, both valves being closed at that time. Ignition of the mixture, by spark plug or otherwise, occurs at or near the top of the compression stroke. The third stroke is a downward power stroke during which the piston is forced downwardly by the expansion of the gases produced by the combustion thereof. Both valves are also closed during this stroke. The fourth stroke is an upward exhaust stroke during which the burned gases are forced outwardly through the exhaust passage, the exhaust valve being open and the intake valve closed during this stroke. The cycle then repeats itself continuously. The times given above for the opening and closing of the valves are of course only approximate, variation thereof being the subject matter of the present invention.

The valves are controlled by cams mounted on a camshaft 32 mounted rotatably alongside the engine block in parallel relation to the crankshaft, being supported in bearings 34 carried by the engine block. At one end of said camshaft is affixed a sprocket wheel 36 operably connected by a sprocket chain 38 to a sprocket wheel (not shown) fixed on the crankshaft, the ratio of the sprocket wheels being such that camshaft 32 completes one full revolution for each two revolutions of the crankshaft. Affixed to the camshaft are a series of cams, there being two cams for each intake valve and two cams for each exhaust valve. The two cams for intake valve 22 illustrated are shown at 40 and 42 in FIGS. 1 and 2, and in greater detail in FIGS 3 and 4. While the two cams have different configurations, as will be described, each cam operates a valve lifter, lifter 44 being operated by cam 40, and lifter 46 being operated by cam 42. Said lifters are vertically disposed rod-like members carried slidably in bores provided therefor in an extension 48 of engine block 4, the lower ends thereof resting against the cams so as to be moved vertically thereby. A vertical push rod 50 has its lower end socketed in the upper end of lifter 44, as at 52, and a second vertical push rod 54 has its lower end socketed in the upper end of lifter 46, as at 56. Said push rods are of equal length, and are guided for vertical movement adjacent their upper ends by engagement in bores provided therefor in an extension 58 of engine head 16. A short tilt beam 60 interconnects the upper ends of push rods 50 and 54, said tilt beam having a pair of sockets 62 and 64 in which said push rods are respectively engaged. Said tilt beam extends generally parallel to the engine crankshaft, and sockets 62 and 64 are so enlarged that the tilt beam may rock in the vertical plane of the push rods in response to unequal upward extension of the push rods.

The upper surface of tilt beam 60 is planar, and is engaged slidably by a swivel foot member 66 which is universally pivoted by ball-and-socket joint 68 to one end of a rocker arm 70, said rocker arm being pivoted intermediate its ends on a rocker shaft 72 which extends parallel to the crankshaft, the opposite end of the rocker arm being disposed directly above the upper end of stem 24 of intake valve 22. There is normally a clearance between the rocker arm and the valve stem when valve lifters 44 and 46 are engaged by the lowest points of cams 40 and 42. Similarly, camshaft 32 is provided with a pair of cams 40' and 42' for operating the exhaust valve associated with cylinder 6, said last named cams operating said exhaust valve through a mechanism precisely the same as that described in connection with the intake valve, corresponding parts thereof being designated by corresponding primed numerals, rocker shaft 72 being common to all of the rocker arms of all of the valves of the engine.

As stated above, rocker arms 70–70' are freely pivotable on rocker shaft 72, and must be so to permit independent operation of the valves. Said rocker arms are prevented from moving along the rocker shaft by collars 74 affixed on the shaft. The rocker shaft is mounted for rotation and axial sliding movement in guides affixed to head 16, one such guide being shown at 76. Adjacent one of its ends, shaft 72 has an externally threaded enlargement 78 threaded into a guide 80 affixed to head 16, whereby rotation of said shaft will also cause longitudinal movement thereof. Fixed on the extended end of shaft 72 is a gear pinion 82, which is in turn engaged by a straight gear rack 84, said rack being affixed to the piston rod 86 of a piston 88 operably mounted in a cylinder 90 formed in a housing 92 having a mounting bracket 94 affixed to head 16 by screws 96. Enclosed in the cylinder is a compression spring 98 which biases piston 88 in a direction to cause piston rod 86, rack 84, pinion 82 and threaded enlargement 78 to move rocker shaft 72 in a direction to position swivel feet 66, 66', etc. at points adjacent or directly above push rods 50, 50', etc, so that rocking movement of arms 70, 70', etc. is controlled principally by cams 40, 40', etc. Opposite movement of piston 88, against spring 98, will correspondingly cause swivel feet 66, 66', etc. to be moved gradually to points adjacent or directly above push rods 54, 54', etc., so that rocking movement of arms 70, 70', etc. is controlled principally by cams 42, 42', etc.

Movement of piston 88 is controlled by a hydraulic pump 100 mounted on engine block 4, the drive shaft 102 of said pump having mounted thereon a pulley 104 interconnected by a flexible belt 106 to a pulley (not shown) mounted on the engine crankshaft, whereby the speed of the pump corresponds to the speed of operation of the engine. The pump may be of the positive-displacement type, whereby its hydraulic output will be generally proportionate to the engine speed. The output of the pump is interconnected by conduit 108 to the end of cylinder 90 toward which piston 88 is urged by spring 98. The wall of cylinder 90 has a series of ports 110 formed therein in longitudinally spaced relation, so as to be uncovered successively by piston 88 as said piston moves to the right against spring 98. Each port 110 is interconnected to a hydraulic sump 112 also formed in housing 92, and said sump is interconnected by conduit 114 with the intake side of pump 100. Each port 110 is controlled by a needle valve 116 which may be adjusted from a position external to housing 92 to regulate the rate of flow therethrough. All of needle valves 116 are adjustable separately and independently.

Referring now to FIGS. 3 and 4 showing cams 40 and 42, and assuming that camshaft 32 is turned in direction of arrow 118 during operation of the engine, it will be seen that while cams 40 and 42 are angularly aligned, in that their highest points bear the same angular relationship to the camshaft, cam 40 has a relatively narrow, sharp lobe of relatively small angular extent, and that cam 42 has a relatively broad lobe of greater angular extent. Therefore, if swivel foot 66 were disposed directly above push rod 50 so as to be moved solely or principally by cam 40, intake valve 22 would be opened relatively late in the cycle and remain open for a relatively short time, while if foot 66 were disposed directly above push rod 54 so as to be moved solely or principally by cam 42, intake valve 22 would then be opened relatively early in the cycle, and remain open a relatively longer time. The first condition is desirable for very low engine speeds and the second for very high engine speeds. By moving swivel foot 66 adjustably to positions intermediate the two extremes, optimum valve timing for intermediate engine speeds may be obtained. This intermediate positioning of the swivel foot is provided, in a degree corresponding generally proportionately to the engine speed, by hydraulic fluid delivered by pump 100 to cylinder 90, said fluid forcing piston 88 to the right against spring 98 to act through rack and pinion 86–84 and threaded enlargement 78 of the rocker shaft to position swivel foot 66 as required. For each operating speed of the engine, the pump will deliver fluid to cylinder 90 at a constant rate, and piston 90 will be moved to the right until a sufficient number of ports 110 have been uncovered to allow that amount of fluid to drain through the ports to sump 112. A condition of hydraulic balance will then exist, and piston 88 will remain stationary as long as the engine speed does not change. By careful adjustment of needle valves 116, the correct positioning of swivel feet 66, 66', etc., and hence the correct valve timing, may be obtained for any engine speed. Moreover, said needle valves permit variation in the "pattern" of timing adjustment. For example, if experimentation should indicate that variation of timing is needed primarily only at very high speeds, the needle valves controlling the ports 110 first to be uncovered could be opened more widely, so that a large hydraulic flow, reflecting high engine speed, would be required to move piston 88 to any great degree. On the other hand, if experimentation should indicate that more timing adjustment is necessary or desirable at lower engine speeds, the needle valves of the initial ports could be adjusted to more closely flow-restricting positions, so that the lower hydraulic flow rates provided by lower engine speeds would nevertheless cause greater movement of piston 88.

It might at first thought appear that since the first elevation of valve lifter 46 by cam 42, which begins when point A of said cam engages the lifter, begins to elevate and tilt the associated tilt beam 60, that valve 22 would therefore start to open at that moment regardless of the fact that cam 40 would then be inoperative so far as lifter 44 is concerned, and regardless of the position of swivel foot 66 on the tilt beam. Although adjusting swivel foot 66 could under this condition affect the speed of opening, this condition would negative any possibility that the time of opening, or closing, could be adjusted, and would not be permissable. However, this condition does not exist, due to the previously mentioned valve clearance which normally exists between rocker arms 70, 70', etc. and their associated valve stems. Referring to FIGS. 3 and 4, it will be seen that assuming that cam 40 were the sole control of the valve, it would begin to elevate lifter 44 when point B of the cam contacts said lifter, and it may be assumed by way of example that the cam must turn further until point C thereof engages the lifter before the valve clearance is taken up and valve 22 actually begins to open. Angularly corresponding points A, B and C are also indicated on cam 42 in FIG. 4. Assuming next that cam 42 were the sole control of valve 22, it will be seen that it begins to elevate lifter 46 at point A, has fully taken up the valve clearance at point B, and has actually opened the valve to a considerable degree at point C. Taking into account that both cams 40 and 42 contribute to the control of valve 22 through tilt beam 60, it will therefore be apparent that by adjustment of swivel foot 66 along said tilt beam as described, actual opening of the valve may be initiated at any point of the cams between points B and C.

Exhaust valve cams 40' and 42' are identical to intake valve cams 40 and 42, except that the angular position of their high points with respect to camshaft 32 is about 90 degrees "ahead" of the cams 40 and 42, in order that the exhaust valve will be closed at about the same time the intake valve is opened. Actually, with the adjustment of swivel feet 66, 66', etc. shown in the drawing, and at the angular position of the cams illustrated, both the intake valve and the exhaust valve are open at the same time, although the exhaust valve is completing its closing movement while the intake valve is only starting its opening movement. This "overlap" of the open periods of the intake and exhaust valves is common in high speed or racing engines, because it provides better purging of exhaust gases from the cylinder and more efficient filling thereof with fresh air-gas mixture, by reason of the "blow-through" of vapor from the intake to the exhaust when both are open simultaeously.

Finally, it will be understood that many preexisting automotive engines have sufficient space to accomodate the double cams, cam lifters, push rods and tilt beams required by the present invention. This fact, together with the fact that cylinder housing 92 and hydraulic pump 100 may be attached externally of the engine block, permit the invention to be manufactured as a do-it-yourself "kit" including the necessary special parts, and applied by the purchaser to such pre-existing engines.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In an internal combustion engine including a cylinder having a piston operable therein to rotate a crankshaft, an intake valve controlling the entry of explosive air-gas mixture thereto, an exhaust valve controlling the egress of burned gases of combustion therefrom, means biasing both of said valves to their closed positions, and each of said valves including a stem operable by pressure on the extended end thereof to open said valve, an operating and timing mechanism for said valves comprising:

(a) a camshaft carried rotatably by said engine and operably connected to said crankshaft whereby it is rotated at a speed proportionate to that of said crankshaft, (b) a pair of cams mounted in spaced relation on said camshaft for each of said valves, one of said cams having a relatively sharp lobe of relatively small angular extent and the other of said cams having a relatively broad lobe of relatively large angular extent, said lobes being of equal maximum eccentricity and having their high points angularly aligned with respect to said camshaft, (c) a pair of elongated cam follower devices extending transversely to said camshaft and carried by said engine for longitudinal movement, said follower devices engaging said cams respectively whereby to be moved longitudinally by said cams in response to rotation of said camshaft, (d) a tilt member extending transversely between said follower members and pivotally associated therewith whereby to be tilted in the plane of said follower devices in response to unequal movement of said follower devices, (e) a rocker arm for each valve carried for pivotal movement by said engine on an axis intermediate its ends and parallel to said camshaft, one end of said rocker arm engaging said tilt member whereby it is pivoted by movement of said tilt member by said follower devices, and the other end of said rocker arm being disposed over the extended end of the stem of the associated valve whereby to open said valve responsively and proportionately to the pivotal movement of said rocker arm, and (f) adjusting means for moving said rocker arm in a direction parallel to its pivotal axis, whereby it may be caused to engage said tilt member at or at any position intermediate a point aligned with one of said follower devices and a point aligned with the other of said follower devices.

2. The structure as recited in claim 1 wherein said follower devices each include an elongated push rod having an end thereof rounded for engagement with said tilt member, and wherein said tilt member comprises a straight beam having a pair of sockets formed in one surface thereof, said sockets engaging said push rods respectively to permit tilting of said beam in the plane of said push rods, the opposite surface of said beam being planar and disposed parallel to the beam axis and at right angles to the plane of said push rods, and wherein the end of said rocker arm adjacent said tilt beam is equipped with:

(a) a swivel foot connected for universal pivotal movement to said rocker arm, and having a planar surface resting in sliding contact with said planar tilt beam surface.

3. The structure as recited in claim 1 with the addition of:
   (a) means driven by said engine crankshaft and interconnected with said adjusting means whereby to adjust said rocker arms to a position between said limits of adjustment corresponding to the speed of rotation of said crankshaft.

4. The structure as recited in claim 1 wherein the rocker arms for each of said valves is mounted for free pivotal movement on a rocker shaft, but are restrained against movement along said shaft, and wherein said adjusting means constitutes means for moving said rocker shaft in a direction parallel to its axis.

5. The structure as recited in claim 4 wherein said rocker shaft has a threaded portion engaged in a threaded support fixed to said engine, and wherein said adjusting means includes means for rotating said rocker shaft.

6. The structure as recited in claim 1 wherein said adjusting means comprises:
   (a) a housing affixed to said engine and having a cylinder formed therein,
   (b) a piston operable in said cylinder,
   (c) means interconnecting said piston and said rocker arms and operable to move the latter to a different position of adjustment for each position of said piston in said cylinder,
   (d) resilient means biasing said piston in a direction to move said rocker arms toward alignment with said first named follower devices, and
   (e) a hydraulic pump mounted on said engine and driven by said crankshaft to deliver fluid to said last named cylinder to move said piston against said biasing means, said pump being operable to deliver fluid at a rate generally proportionate to the speed of said crankshaft, said cylinder having a series of exhaust ports formed therein for the egress of fluid therefrom, said exhaust ports being spaced apart longitudinally of said cylinder whereby to be uncovered successively by movement of said piston against said biasing means.

7. The structure as recited in claim 6 with the addition of:
   (a) a series of valves for respectively regulating said exhaust ports, said regulating valves being manually and independently adjustable.

References Cited by the Examiner

UNITED STATES PATENTS

| 1,539,227 | 5/1925 | Wood. | |
| 2,907,311 | 10/1959 | Waldron | 123—90 |

FOREIGN PATENTS

| 543,563 | 3/1942 | Great Britain. |
| 654,240 | 6/1951 | Great Britain. |
| 870,510 | 6/1961 | Great Britain. |

MARK NEWMAN, *Primary Examiner.*

A. L. SMITH, *Assistant Examiner.*